US008987934B2

(12) United States Patent
De Haas

(10) Patent No.: US 8,987,934 B2
(45) Date of Patent: Mar. 24, 2015

(54) POWER SUPPLY WITH EXTENDED MINIMUM VOLTAGE OUTPUT

(75) Inventor: Clemens Gerhardus Johannes De Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 746 days.

(21) Appl. No.: 13/292,181

(22) Filed: Nov. 9, 2011

(65) Prior Publication Data

US 2013/0113276 A1 May 9, 2013

(51) Int. Cl.
*B60L 1/00* (2006.01)
*B60L 3/00* (2006.01)
*H02G 3/00* (2006.01)
*G05F 1/56* (2006.01)

(52) U.S. Cl.
CPC .................. *G05F 1/56* (2013.01)
USPC .................. 307/9.1; 307/10.1

(58) Field of Classification Search
CPC .................. G05F 1/56
USPC .................. 307/9.1
See application file for complete search history.

(56) References Cited

U.S. PATENT DOCUMENTS

| | | | | |
|---|---|---|---|---|
| 8,040,116 | B2 | 10/2011 | Xia et al. | |
| 8,080,983 | B2 | 12/2011 | Lourens et al. | |
| 2005/0180068 | A1 | 8/2005 | Lopata | |
| 2008/0054862 | A1 * | 3/2008 | Hara et al. | 323/234 |
| 2011/0116289 | A1 | 5/2011 | Zong et al. | |

FOREIGN PATENT DOCUMENTS

| | | | |
|---|---|---|---|
| CN | 101714778 | A | 5/2010 |
| CN | 102216867 | A | 10/2011 |

* cited by examiner

*Primary Examiner* — Rexford Barnie
*Assistant Examiner* — Toan Vu

(57) ABSTRACT

Various exemplary embodiments relate a system for supplying power. The system may include a power source outputting a source voltage, a regulator connected to the power source, and an extension module connected to the power source. The regulator may output a first voltage when the source voltage is above a minimum threshold, and the extension module may output a second voltage when the source voltage falls below the minimum threshold.

20 Claims, 5 Drawing Sheets

POWER SUPPLY WITH EXTENDED MINIMUM VOLTAGE OUTPUT

TECHNICAL FIELD

Various exemplary embodiments disclosed herein relate generally to regulated power supplies.

BACKGROUND

A voltage regulator is an electrical component designed to automatically output a constant voltage level to a load. Voltage regulators are able to output a constant voltage level when a voltage input to the regulator is above a minimum threshold. The minimum threshold is typically much larger than the constant voltage level the regulator is designed to output. In a low-dropout (LDO) regulator, the minimum threshold of the input voltage is closer to the voltage level of the output voltage, but remains some amount higher than the output voltage. When the input voltage falls below the minimum threshold of the regulator, the regulator may no longer function as designed.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to system for supplying power including: a power source outputting a source voltage; a first regulator connected to the power source, wherein the first regulator outputs a first voltage when the source voltage is above a minimum threshold; and an extension module connected to the power source, wherein the extension module outputs a second voltage when the source voltage falls below the minimum threshold.

Various exemplary embodiments further relate to a method for supplying power including: outputting a source voltage from a power source; connecting a first regulator to the power source, wherein the first regulator outputs a first voltage when the source voltage is above a minimum threshold; and connecting an extension module to the power source, wherein the extension module outputs a second voltage when the source voltage falls below the minimum threshold.

In some embodiments, the first regulator is a low-dropout regulator. In some embodiments, the extension module shares circuit components with the low-dropout regulator. In some embodiments, the shared circuited components are transistors forming a current mirror. In some embodiments, the system for supplying power further includes: a microcontroller having a memory and processor core, wherein the second voltage is below a minimum voltage requirement of the processor core and above a minimum voltage requirement of the memory. In some embodiments, the first regulator is disabled when the source voltage falls below the minimum threshold, and wherein the extension module is disabled when the source voltage is above the minimum threshold. In some embodiments, the system for supplying power further includes: a second regulator for supplying a signal to the first regulator and the extension module, wherein the signal disables the first regulator and enables the extension module when the source voltage falls below the minimum threshold.

In some embodiments, the first regulator, second regulator, and extension module are integrated on a system chip. In some embodiments, the power source is vehicle battery. In some embodiments, the source voltage falls below the minimum threshold upon the starting of a vehicle engine.

BRIEF DESCRIPTION OF THE DRAWINGS

In order to better understand various exemplary embodiments, reference is made to the accompanying drawings, wherein.

DETAILED DESCRIPTION

Figure 1:
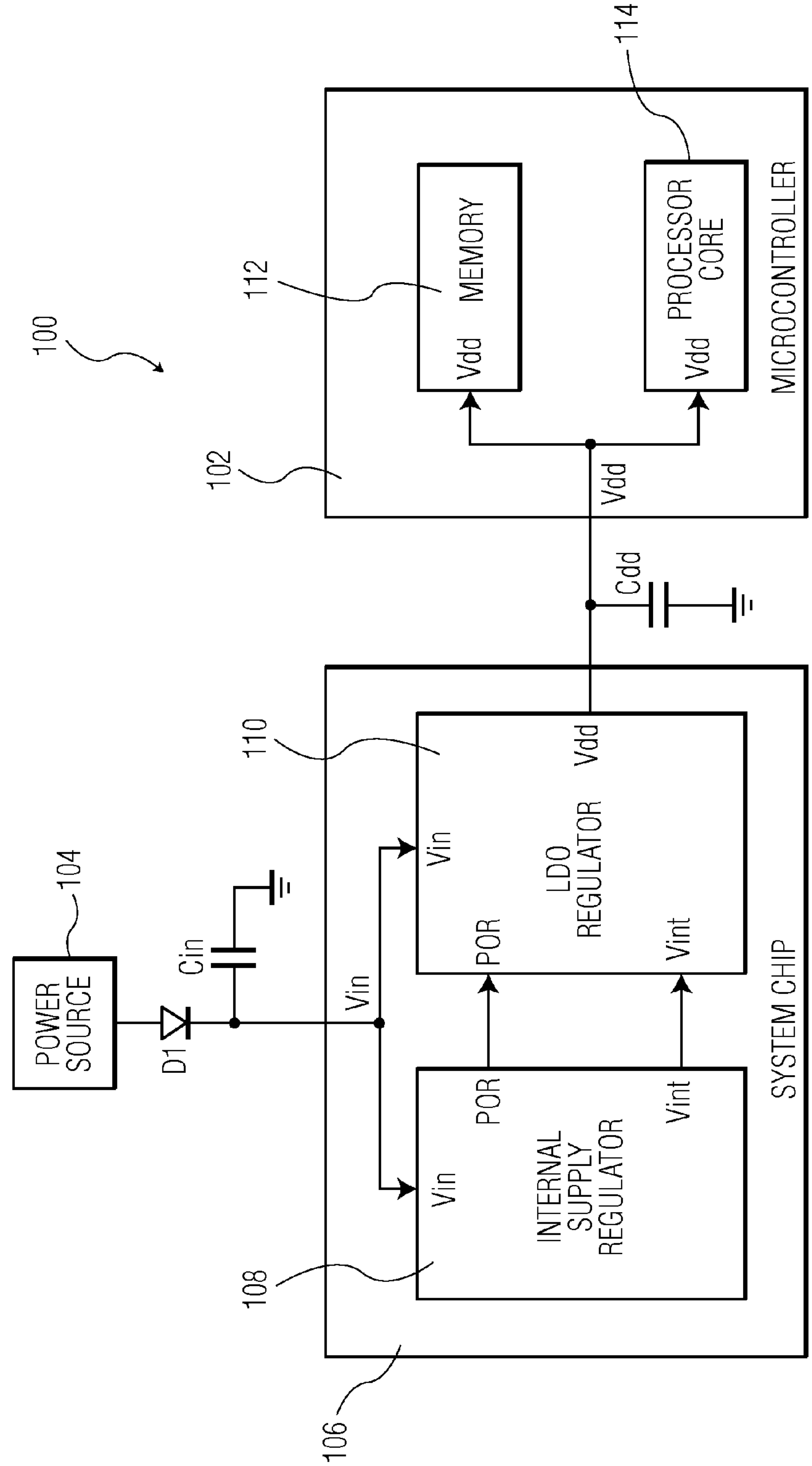
FIG. 1 PRIOR ART
FIG. 1 illustrates an embodiment of a conventional system for supplying power.

Referring now to the drawings, in which like numerals refer to like components or steps, there are disclosed broad aspects of various exemplary embodiments.

It should be appreciated by those skilled in the art that any block diagrams herein represent conceptual views of illustrative circuitry embodying the principals of the embodiments of the invention.

According to the foregoing, various exemplary embodiments provide for a system and method for a power supply with an extended minimum voltage output.

FIG. 1 illustrates an embodiment of a conventional system 100 for supplying power to a microcontroller 102. A power source 104 may be connected to a system chip 106. The system chip 106 may include an internal supply regulator 108 and a low-dropout (LDO) regulator 110 for regulating the power supplied to the microcontroller 102. The microcontroller 102 may include a memory 112 and a processor core 114.

The power source 104 may be a battery or other source for supplying a direct current voltage Vin. In some embodiments, the power source 104 may be, for example, a 12V car battery. A diode D1 may be connected in series between the power source 104 and the system chip 106. A capacitor Cin may be connected between ground and a node between the diode D1 and the system chip 106. A capacitor Cdd may be connected between ground and a node between the system chip 106 and the microcontroller 102.

The voltage (Vin) supplied by the power source 104 may be routed to the internal supply regulator 108 and the LDO regulator 110 in the system chip 106. The internal supply regulator 108 may be used to distribute regulated power and signals to other components of the system chip 106. When Vin is above a minimum threshold, the internal supply regulator 108 may output a power-on-reset (POR) signal and an internal supply voltage (Vint) to the LDO regulator 110. The POR signal may be used to enable or disable the LDO regulator 110. When the LDO regulator 110 is enabled, it may output a voltage Vdd to the microcontroller 102. The voltage Vdd may be routed to the memory 112 and the processor core 114 of the microcontroller 102.

In some embodiments, the system 100 may include components of a vehicle. The power source 104 may be, for example, a 12V car battery. The system chip 106 may be used to regulate the voltage from the 12V car battery to a lower voltage level that is safe for other components in the vehicle, such as, for example, the microcontroller 102. The voltage supplied by the 12V car battery may vary as the battery is used with other parts of the vehicle. For example, during the starting of a vehicle engine, the voltage supplied by 12V car battery may drop below 3V.

The memory 112 in the microcontroller 102 may operate at a lower voltage than the processor core 114 (for example, 2V for the memory and 3V for the core). The lower voltage requirement for the memory 112 may allow the memory to keep stored content valid during power reductions, such as, for example, during the starting of a vehicle engine. However, in the conventional system 100, the LDO regulator 110 may be unable to output the voltage Vdd when the voltage supplied by the power source 104 (Vin) is reduced below a minimum threshold. For example, the internal supply regulator 108 may have a minimum Vin voltage requirement of 3V. If a lower Vin voltage of 2V is supplied by the power source 104, the internal voltage regulator 108 may stop outputting the POR signal. When the POR signal is low, the LDO regulator may be disabled, and no voltage Vdd may be supplied to the microcontroller 102. Alternatively, the LDO regulator 110 may have a minimum Vin voltage requirement itself and may no longer output the voltage Vdd upon Vin dropping below the minimum requirement. When the voltage Vdd is no longer supplied to the microcontroller, the memory 112 may be reset.

Figure 2:
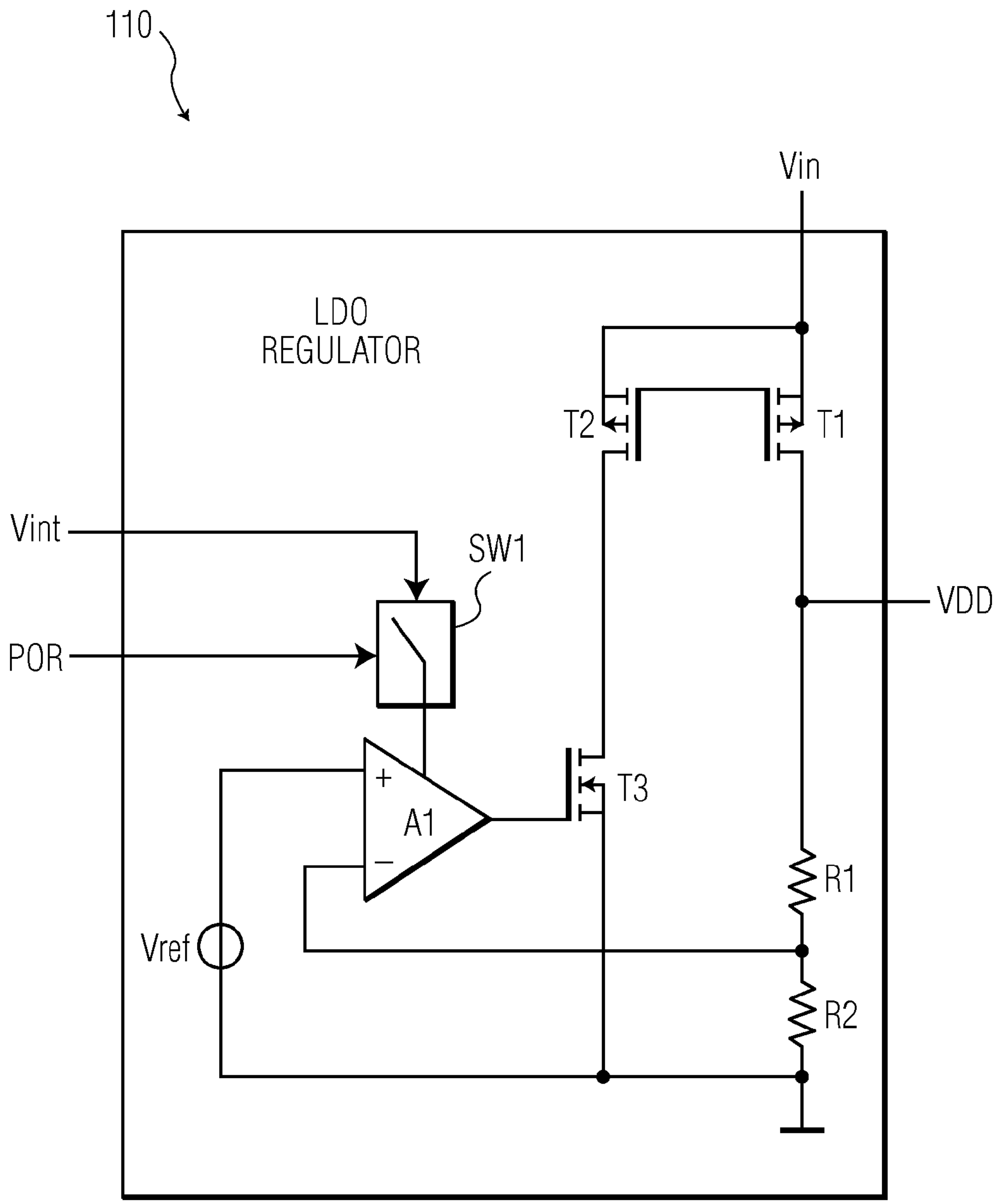
FIG. 2 PRIOR ART
FIG. 2 illustrates an embodiment of a conventional low-dropout regulator.

FIG. 2 illustrates an embodiment of the conventional LDO regulator 110. The LDO regulator 110 may include a high-voltage current mirror (T1, T2), a driver transistor (T3), and a transconductance amplifier (A1) in a negative feedback configuration. Two resistors (R1, R2) may be used to bias the amplifier (A1). The LDO regulator 110 may be powered down by the POR signal, which may control a switch (SW1) connecting the low-voltage Vint signal to the amplifier (A1).

Figure 3:
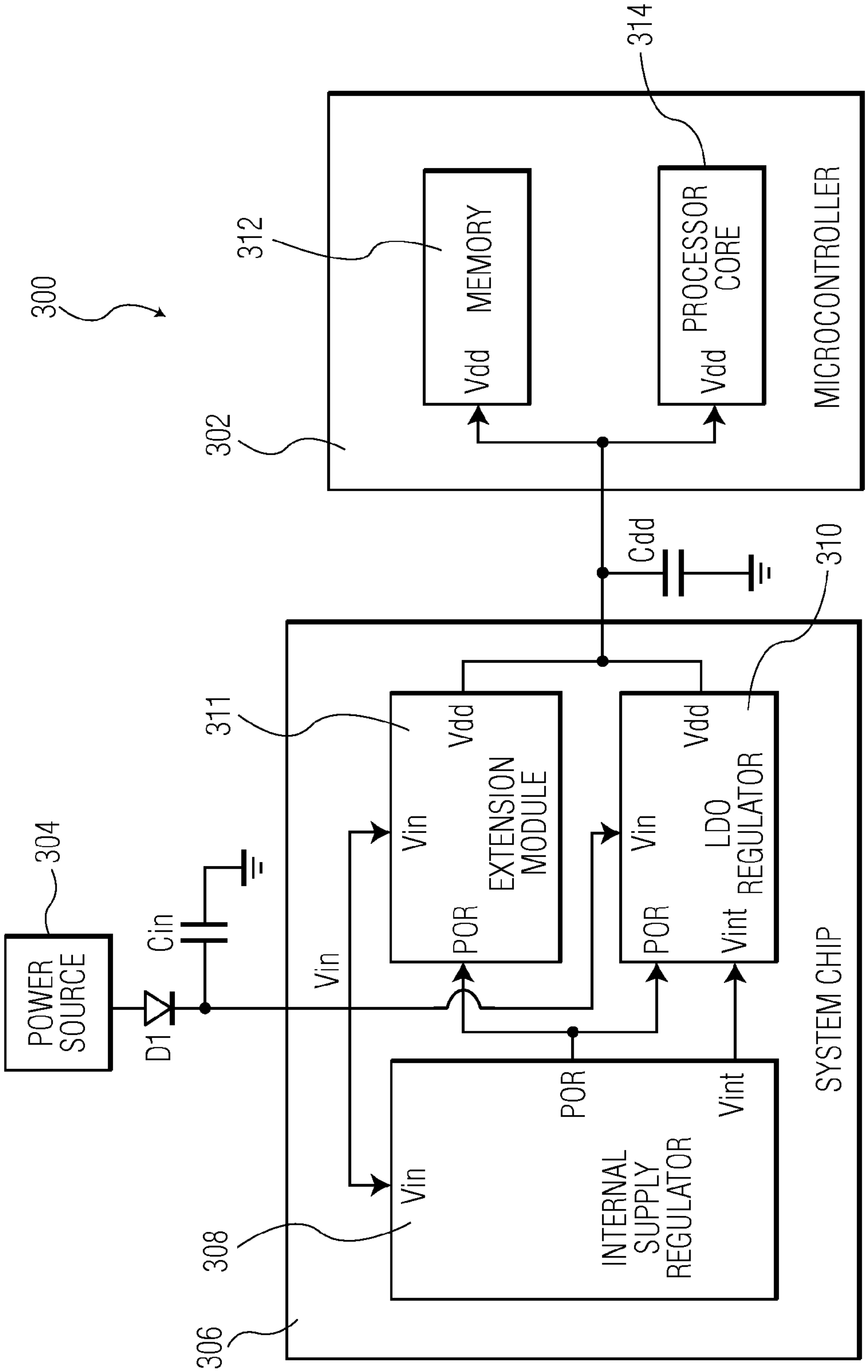
FIG. 3 illustrates an embodiment of a system for supplying power.

FIG. 3 illustrates a system 300 for supplying power to a microcontroller 302 according to an embodiment of the present invention. A power source 304 may be connected to a system chip 306. The system chip 306 may include an internal supply regulator 308, a low-dropout (LDO) regulator 310, and an extension module 311 for regulating the power supplied to the microcontroller 302. The extension module 311 may be a separate component or integrated in the LDO regulator 310.

The microcontroller 302 may include a memory 312 and a processor core 314. The power source 304 may be a battery or other source for supplying a direct current voltage Vin. In some embodiments, the power source 304 may be, for example, a 12V car battery. A diode D1 may be connected in series between the power source 304 and the system chip 306. A capacitor Cin may be connected between ground and a node between the diode D1 and the system chip 306. A capacitor Cdd may be connected between ground and a node between the system chip 306 and the microcontroller 302.

The voltage (Vin) supplied by the power source 304 may be routed to the internal supply regulator 308, the LDO regulator 310, and the extension module 311 in the system chip 306. The internal supply regulator 308 may be used to distribute regulated power and signals to other components of the system chip 306. When Vin is above a minimum threshold, the internal supply regulator 308 may output a power-on-reset (POR) signal to the LDO regulator 310 and the extension module 311. The internal supply regulator may also output an internal supply voltage (Vint) to the LDO regulator 310. The POR signal may be used to enable or disable the LDO regulator 310 and the extension module 311. The LDO regulator 310 and extension module 311 may output a voltage Vdd to the microcontroller 302. The voltage Vdd may be routed to the memory 312 and the processor core 314 of the microcontroller 302.

Similar to the conventional system 100, in some embodiments the system 300 illustrated in FIG. 3 may include components of a vehicle. The power source 304 may be, for example, a 12V car battery. The system chip 306 may be used to regulate the voltage from the 12V car battery to a lower voltage level that is safe for other components in the vehicle, such as, for example, the microcontroller 302. The voltage supplied by the 12V car battery may vary as the battery is used with other parts of the vehicle. For example, during the starting of a vehicle engine, the voltage supplied by 12V car battery may drop below 3V.

Unlike the conventional system 100, the system 300 illustrated in FIG. 3 may continue to supply a voltage Vdd to the microcontroller 302 when the Vin voltage supplied by the power source 304 is below the minimum voltage requirement of the internal supply regulator 308 and the LDO regulator 310. For example, the internal supply regulator 308 may have a minimum Vin voltage requirement of 3V, as described above. If a lower Vin voltage of 2V is supplied by the power source 304, the internal voltage regulator 308 may stop outputting the POR signal. When the POR signal is low, the LDO regulator may be disabled, and the extension module 311 may be enabled. The extension module 311 may then continue supplying a Vdd voltage to the microcontroller 302. The extension module 311 may supply a voltage Vdd to the microcontroller 302 that is lower than the Vdd voltage normally output by the LDO regulator 310. The Vdd voltage supplied by the extension module 311, while lower than normally output by the LDO regulator 310, may be capable of preventing the memory 312 from being reset. For example, the LDO regulator 310 may be disabled when Vin drops to 2.5V, but the extension module 311 may continue to supply a Vdd voltage of greater than 2V to the microcontroller 302. If the memory has a minimum voltage requirement of 2V, then the data stored in the memory may be preserved.

Figure 4:
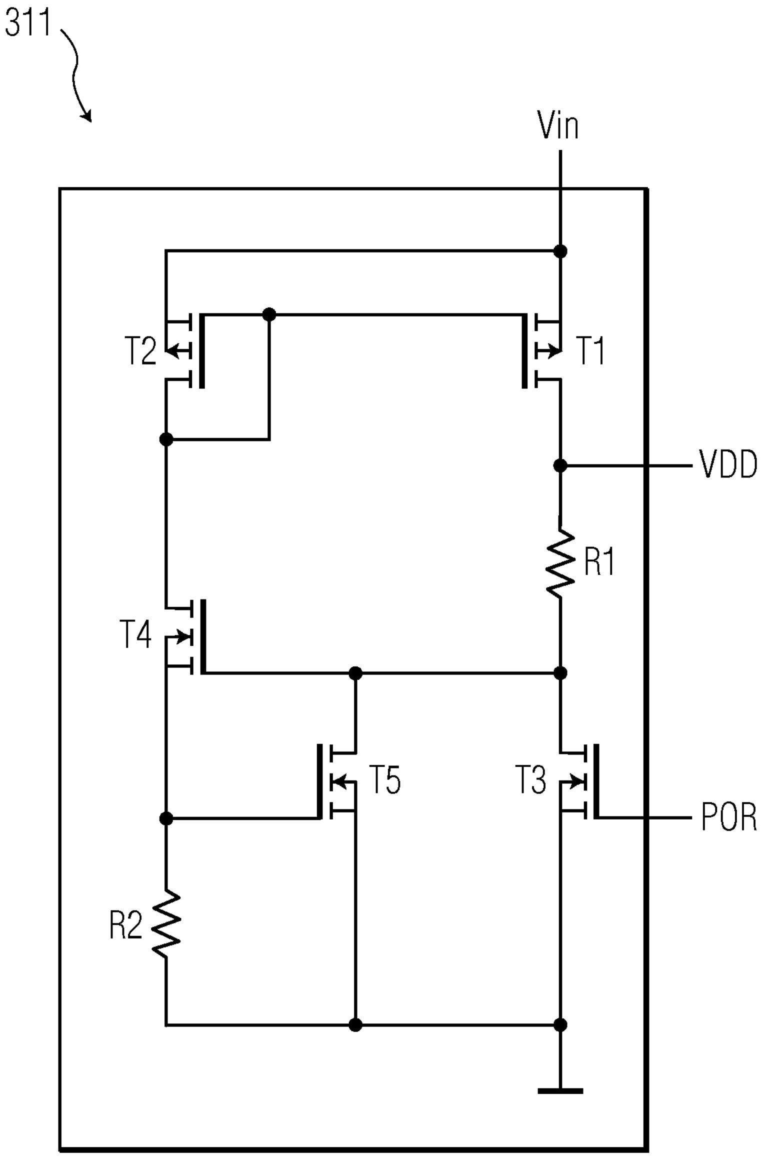
FIG. 4 illustrates an embodiment of an extension module.

FIG. 4 illustrates an embodiment of the extension module 311. When the power source voltage Vin is above the minimum supply voltage of the internal supply regulator 308 and LDO regulator 310 (for example, Vin>3V), the internal supply regulator 308 may output a high POR signal. The high POR signal may enable the LDO regulator 310 and may disable the extension module 311 by activating transistor T3, as illustrated in FIG. 4. When the power source voltage Vin drops below the minimum supply voltage of the internal supply regulator 308 and LDO regulator 310 (for example, Vin<3V), the LDO regulator 310 may be disabled by a low POR signal and the extension module 311 may be enabled by deactivating transistor T3. Resistor R1 may activate a current reference circuit built around transistors T4 and T5 and resistor R2. The drain current of transistor T4 may be amplified by a current mirror formed by transistors T1 and T2 such that the minimum output current may be higher than the current required by the memory 312 in the microcontroller 302. With this topology a normal-on current source may be created. The current reference transistor T4 may be active only with a certain minimum voltage at the Vdd output of the system chip 306, because the drain current of transistor T5 may be supplied out of the Vdd output pin via resistor R1. This may result in the extension module 311 not being active when the voltage Vin supplied by the power source 304 is increasing from 0V. However, the extension module 311 may be active when the voltage Vin supplied by the power source 304 is decreasing below the minimum voltage requirement of the internal supply regulator 308 and LDO regulator 310. By activating the extension module 311 when Vin is falling, the data stored in the memory 312 may be preserved as long as the voltage Vdd is greater than the minimum voltage requirement of the memory 312.

Figure 5:
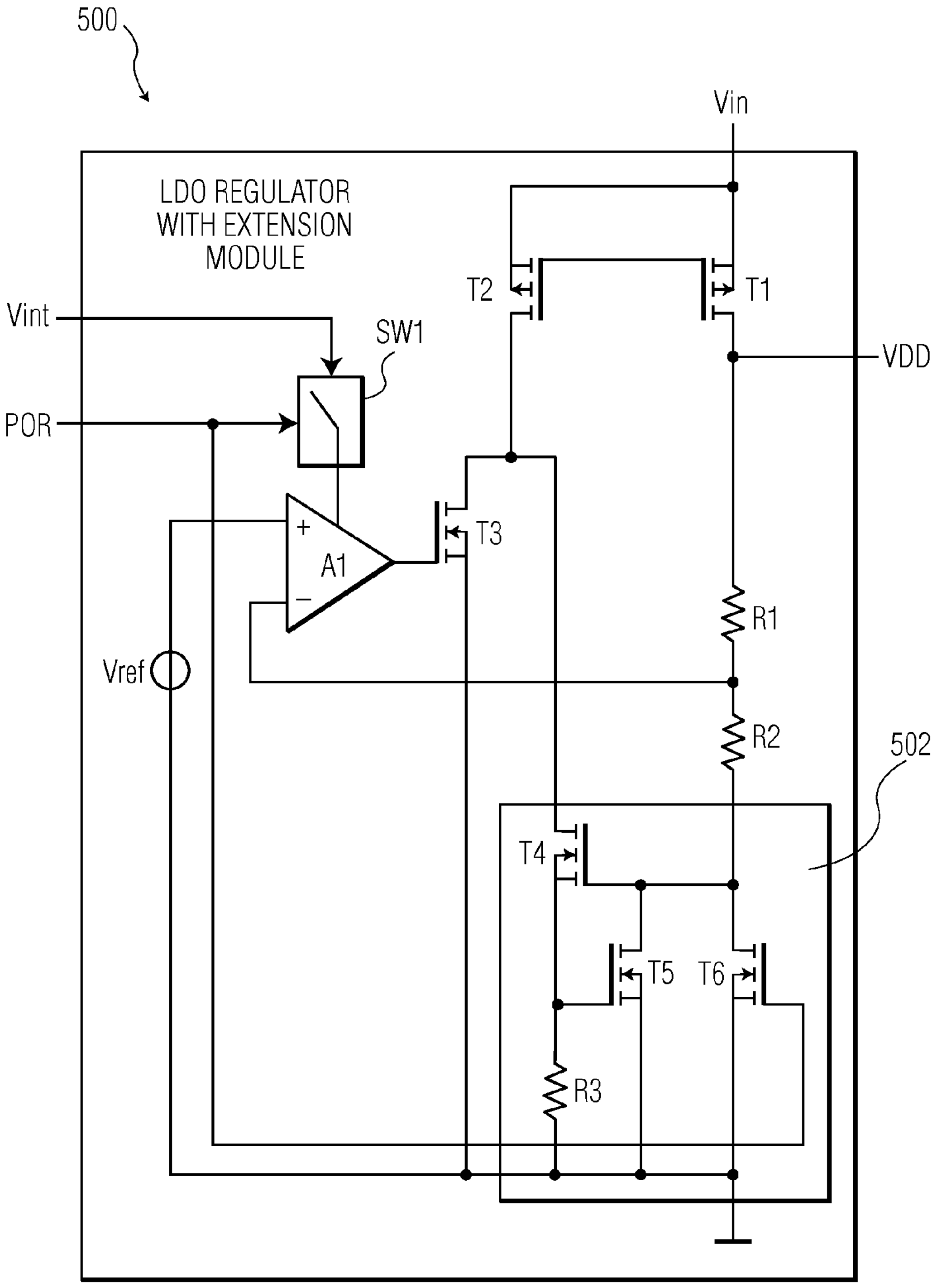
FIG. 5 illustrates an alternate embodiment of a low-dropout regulator.

FIG. 5 illustrates an alternate embodiment of an LDO regulator 500 with an integrated extension module 502. Some components of the conventional LDO regulator 110, as shown in FIG. 2, may be reused as components of the extension module 502, namely the output current mirror (T1,T2) and the feedback resistors (R1,R2). The transistors T1 and T2 may form a current source when used by the extension module 502. The extension module 502 may further include a current reference formed by transistors T4 and T5 and resistor R3, and a switch formed by transistor T6.

The circuit may operate similar to the standalone extension module 311 described above. When the power source voltage Vin is above the minimum supply voltage of the internal supply regulator 308 and LDO regulator 310 (for example, Vin>3V), the internal supply regulator 308 may output a high POR signal. The high POR signal may enable the LDO regulator 310 and may disable the extension module 502 by activating transistor T6, as illustrated in FIG. 5. When the power source voltage Vin drops below the minimum supply voltage of the internal supply regulator 308 (for example, Vin<3V), the LDO regulator 500 may be disabled by a low POR signal and the extension module 502 may be enabled by deactivating transistor T6. Resistors R1 and R2 may activate the current reference circuit built around transistors T4 and T5 and resistor R3. The drain current of transistor T4 may be amplified by a current mirror formed by transistors T1 and T2 such that the minimum output current is higher than the current required by the memory 312 in the microcontroller 302. With this topology a normal-on current source may be created. The current reference transistor T4 may be active only with a certain minimum voltage at the Vdd output of the system chip 306, because the drain current of transistor T5 may be supplied out of the Vdd output pin via resistors R1 and R2. This may result in the extension module 502 not being active when the voltage Vin supplied by the power source 304 is increasing from 0V. However, the extension module 502 may be active when the voltage Vin supplied by the power source 304 is decreasing below the minimum voltage requirement of the internal supply regulator 308. By activating the extension module 502 when Vin is falling, the data stored in the memory 312 may be preserved as long as the voltage Vdd is greater than the minimum voltage requirement of the memory 312.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for supplying power comprising:

a power source configured to output a source voltage;

a first regulator connected to the power source, wherein the first regulator is configured to output a first voltage when the source voltage is above a minimum threshold; and an extension module connected to the power source, wherein the extension module is configured to output a second voltage when the source voltage falls below the minimum threshold and produce a minimum output current higher than a current required by a memory.

2. The system for supplying power of claim 1, wherein the first regulator is a low-dropout regulator.

3. The system for supplying power of claim 2, wherein the extension module shares circuit components with the low-dropout regulator.

4. The system for supplying power of claim 3, wherein the shared circuit components are transistors forming a current mirror.

5. The system for supplying power of claim 1, wherein the system is configured to supply power to a microcontroller having a memory and a processor core, and the second voltage is below a minimum voltage requirement of the processor core and above a minimum voltage requirement of the memory.

6. The system for supplying power of claim 1, wherein the first regulator is disabled when the source voltage falls below the minimum threshold, and the extension module is disabled when the source voltage is above the minimum threshold.

7. The system for supplying power of claim 1, further comprising:

a second regulator configured to supply a signal to the first regulator and the extension module, wherein the signal disables the first regulator and enables the extension module when the source voltage falls below the minimum threshold.

8. The system for supplying power of claim 7, wherein the first regulator, the second regulator, and the extension module are integrated on a system chip.

9. The system for supplying power of claim 1, wherein the power source is vehicle battery.

10. The system for supplying power of claim 9, wherein the source voltage falls below the minimum threshold upon the starting of a vehicle engine.

11. A method for supplying power comprising:

outputting a source voltage from a power source;

outputting a first voltage by a first regulator connected to the power source when the source voltage is above a minimum threshold;

outputting a second voltage by an extension module connected to the power source when the source voltage falls below the minimum threshold; and outputting, by the extension module, a minimum output current higher than a current required by a memory, when the source voltage falls below the minimum threshold.

12. The method for supplying power of claim 11, wherein the first regulator is a low-dropout regulator.

13. The method for supplying power of claim 12, wherein the extension module shares circuit components with the low-dropout regulator.

14. The method for supplying power of claim 13, wherein the shared circuit components are transistors forming a current mirror.

15. The method for supplying power of claim 11, further comprising:

outputting the second voltage to a microcontroller having a memory and a processor core, wherein the second voltage is below a minimum voltage requirement of the processor core and above a minimum voltage requirement of the memory.

16. The method for supplying power of claim 11, further comprising:

disabling the first regulator when the source voltage falls below the minimum threshold; and disabling the extension module when the source voltage is above the minimum threshold.

17. The method for supplying power of claim 11, further comprising:

supplying a signal from a second regulator to the first regulator and the extension module, wherein the signal disables the first regulator and enables the extension module when the source voltage falls below the minimum threshold.

18. The method for supplying power of claim 17, wherein the first regulator, the second regulator, and the extension module are integrated on a system chip.

19. The method for supplying power of claim 11, wherein the power source is a vehicle battery.

20. The method for supplying power of claim 19, wherein the source voltage falls below the minimum threshold upon the starting of a vehicle engine.

* * * * *